United States Patent [19]

Lee

[11] Patent Number: 4,881,302
[45] Date of Patent: Nov. 21, 1989

[54] CORD OR ROD CLAMP

[76] Inventor: So-Sun K. Lee, #1-38 Moonwa-Dong Apt. D-408, Choong-ku, Daejeon, Choong-nam, Rep. of Korea

[21] Appl. No.: 215,998

[22] Filed: Jul. 7, 1988

[51] Int. Cl.$^4$ ............................................. F16G 11/00
[52] U.S. Cl. ................................ 24/136 R; 24/115 G; 403/211
[58] Field of Search ............ 24/136 R, 136 L, 115 M, 24/115 G, 503; 403/211

[56] References Cited

U.S. PATENT DOCUMENTS

| | | | |
|---|---|---|---|
| 1,504,087 | 8/1924 | Brady | 24/136 R |
| 1,634,422 | 7/1927 | Holmes | 24/136 R |
| 3,776,586 | 12/1973 | Ahlgren et al. | 24/136 R |
| 3,897,161 | 7/1975 | Reinwall, Jr. | 403/211 |
| 4,250,734 | 2/1981 | Tinsley | 24/136 R |
| 4,288,891 | 9/1981 | Boden | 24/115 G |
| 4,328,605 | 5/1982 | Hutchison et al. | 24/115 G |
| 4,336,636 | 6/1982 | Ishiguro et al. | 24/115 M |

FOREIGN PATENT DOCUMENTS 1276059  10/1961  France ............................ 24/115 G Primary Examiner—Victor N. Sakran
Attorney, Agent, or Firm—Donald A. Kettlestrings

[57] ABSTRACT

A cord or rod clamp includes a housing defining a central opening and having jaw members and wedge members located within the housing. Spring elements normally position the jaw members in substantially contacting relationship with each other and within the opening, and the wedge members are operated to selectively separate the jaw members from each other to permit insertion of a cord or rod into the opening and between the jaw members.

21 Claims, 5 Drawing Sheets

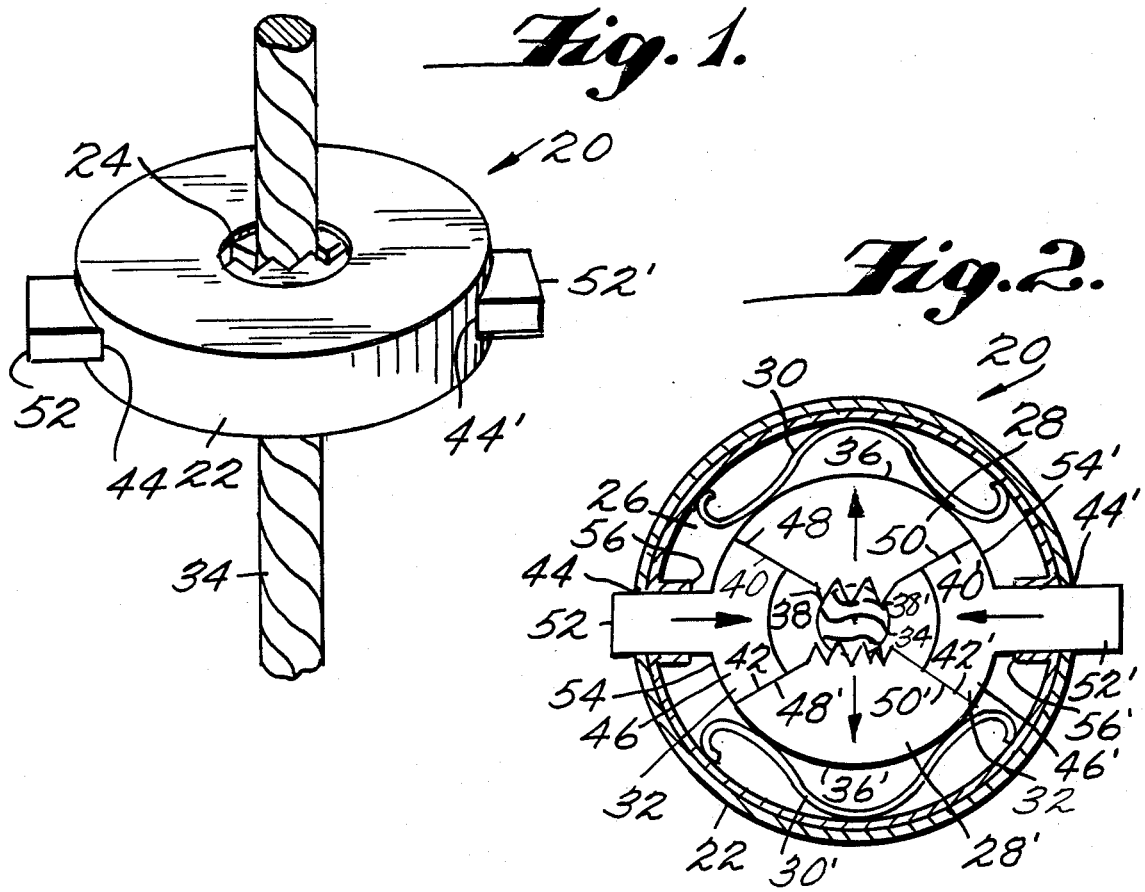
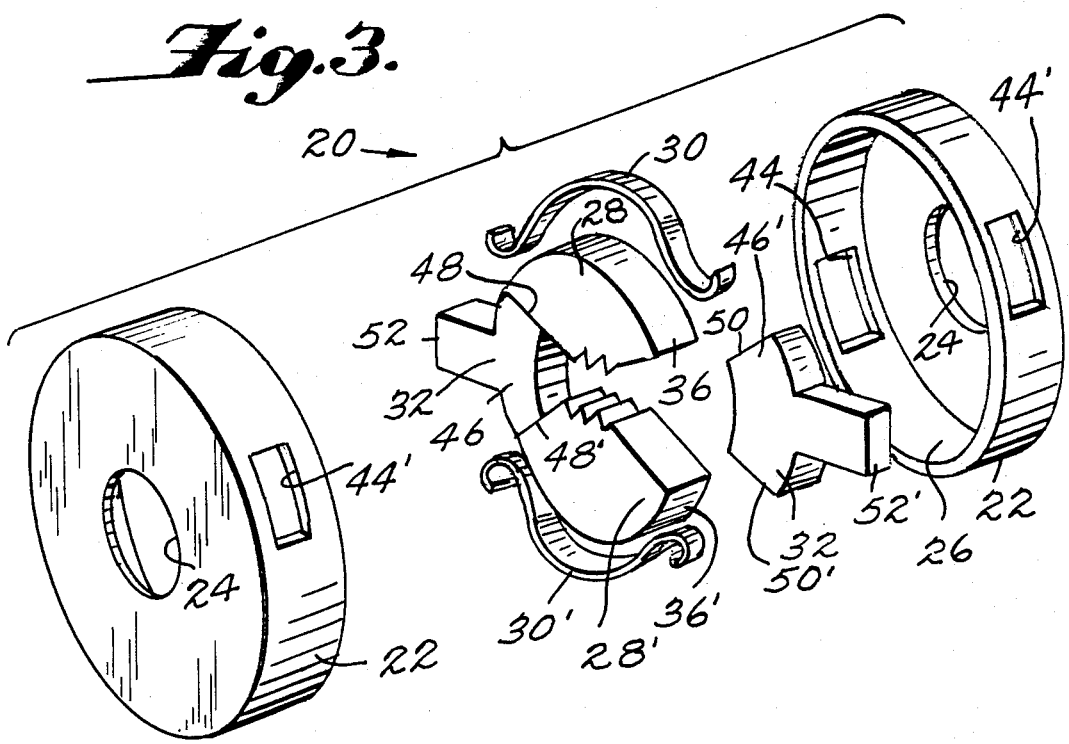

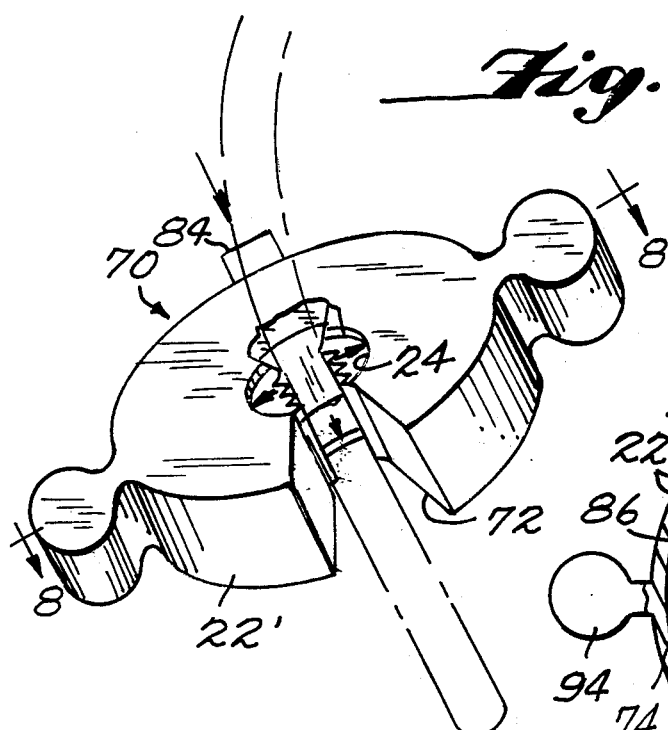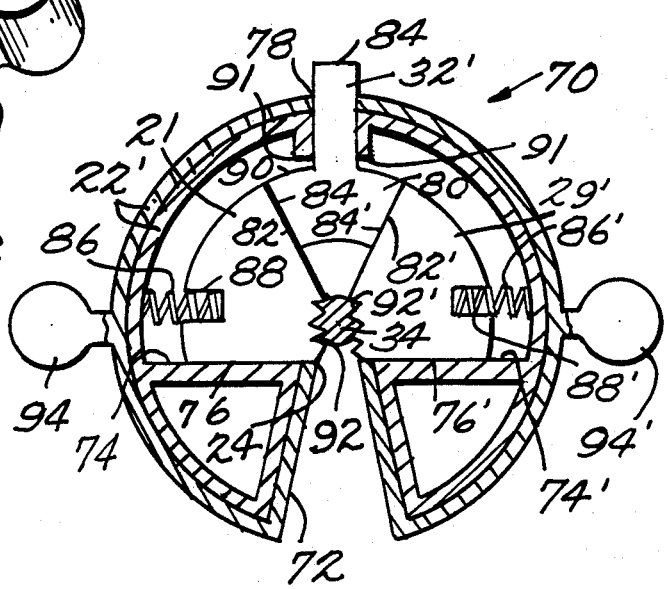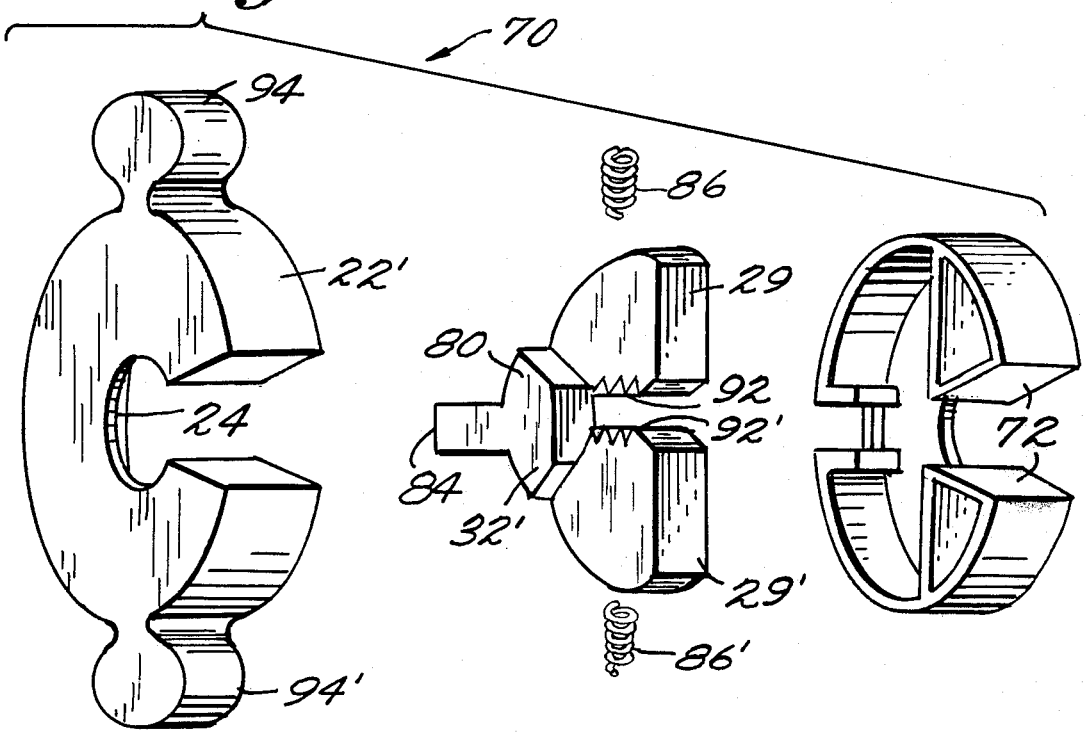

CORD OR ROD CLAMP

This invention relates to a cord or rod clamp and more particularly to such a clamp which can be used as a stopper or spacer for flexible cords or ropes and as a clamp or lock-nut for stiff rods or bolts.

Several types of cord clamps or locks are known which comprise sleeve and plunger members which are axially movable with respect to one another. The sleeve and plunger members are typically provided with side wall apertures through which a cord or cords can extend. The cord or cords are locked or clamped when the sleeve and plunger are axially moved relative to each other by a spring.

Although such known clamps or locks have served the purpose, they have not proved entirely satisfactory under all conditions of service because there is some difficulty in initially inserting a cord or cords into the side wall apertures of the sleeve and plunger members which may be moving relative to each other during the process of insertion of the cord. Further, only a flexible cord which bends can be used with such devices to enable the devices to be firmly locked into position on the cord. Examples of existing clamps or locks are Hutchison et al., patent no. 4,328,605 and Boden, patent no. 4,288,891.

It is, therefore, an object of the present invention to provide a cord or rod clamp which can be used with flexible cords and stiff rods or bolts.

Another object is to provide a cord or rod clamp which permits quick and easy insertion of the cord or rod into the clamp.

A further object of the invention is the provision of such a cord or rod clamp which can lock or clamp stiff rods and flexible cords without any bends occurring in the rod or cord.

Still another object is to provide such a cord or rod clamp which permits quick and easy lateral insertion of a cord or rod into the clamp.

A still further object is to provide a cord or rod clamp which incorporates serrations or teeth to bite into or grip cords or rods.

Yet another object of the present invention is the provision of a cord or rod clamp which can be positioned at any desired location along the length of a flexible cord or a rigid rod.

Another object is to provide a cord clamp which can be attached to a flexible cord to act as a stopper without requiring ties or knots in the cord.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

To achieve these and other objects the present invention provides a cord or rod clamp, comprising: a housing defining a central opening and an interior compartment in fluid communication with the opening; first and second opposed jaw members movably positioned within the compartment; means in operative relationship with the housing and with the jaw members for normally positioning the jaw members in substantially contacting relationship with each other within the opening; and wedge means in operative relationship with the housing and with the jaw members for enabling an operator to selectively separate the jaw members from each other to permit insertion of a cord or rod into the opening and between the jaw members.

It is to be understood that both the foregoing general description and the following detailed description are exemplary and explanatory but are not restrictive of the invention.

The accompanying drawings, which are incorporated in and constitute a part of this specification, illustrate examples of preferred embodiments of the invention and, together with the description, serve to explain the principles of the invention.

FIG. 1 is a perspective view of one embodiment of the invention;

FIG. 2 is a view, partly in section, of the embodiment shown in FIG. 1;

FIG. 3 is an exploded perspective view of the embodiment shown in FIG. 1;

Figure 4:
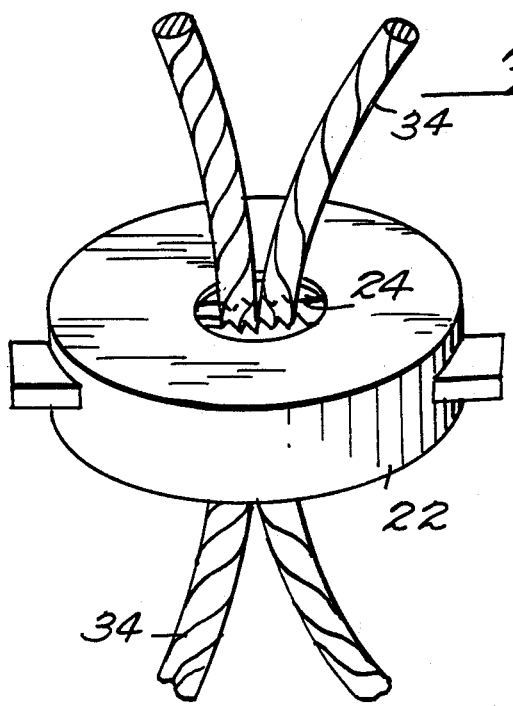
FIG. 4 is a perspective view of another embodiment of the invention.
Figure 6:
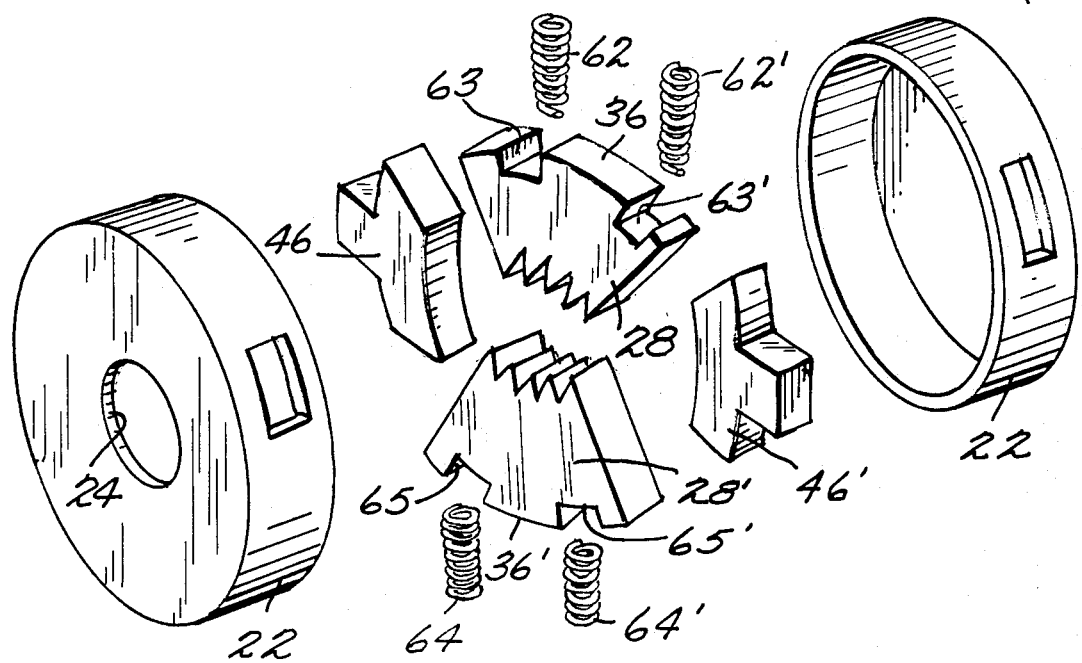
Figure 10:
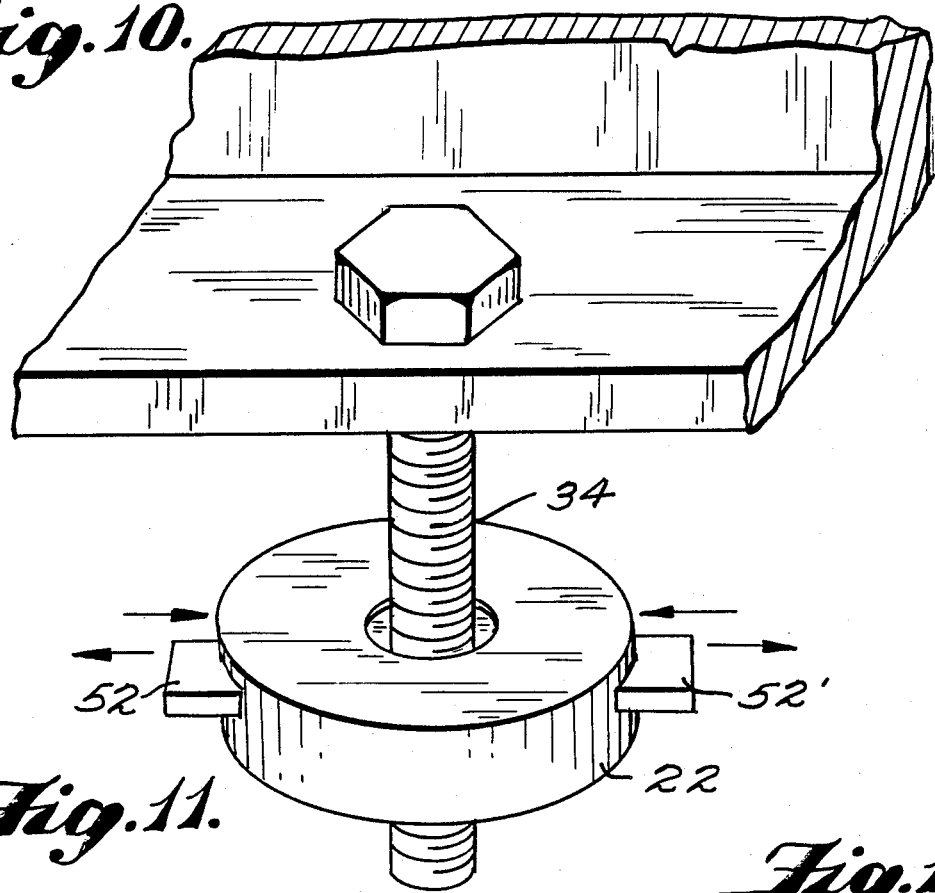
Figure 11:
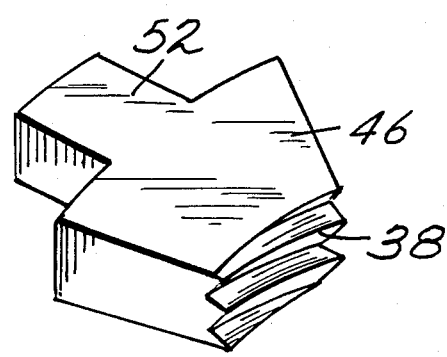
Figure 13:
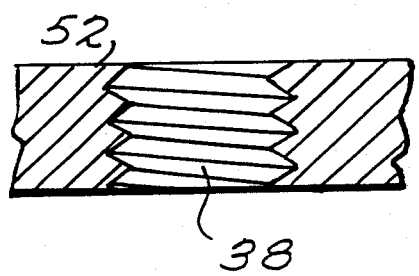
Figure 12:
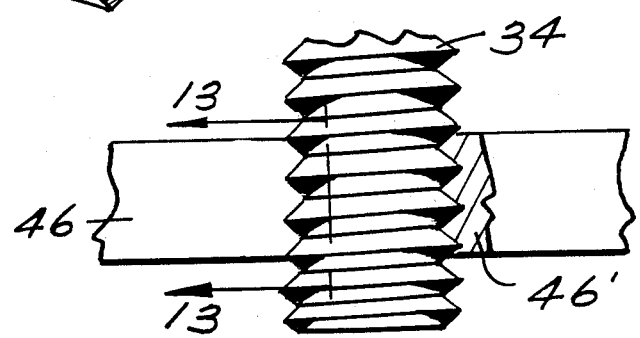
Figure 14:
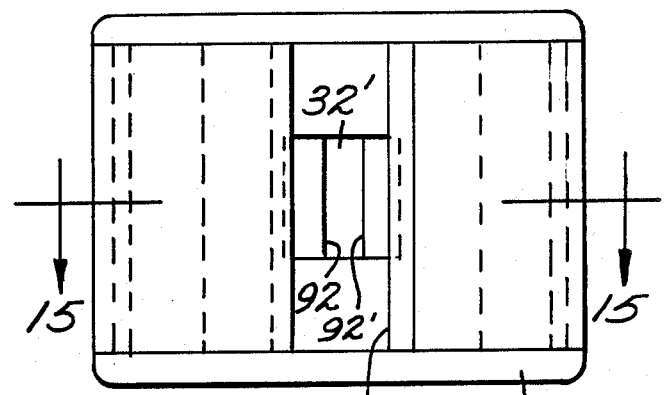
Figure 15:
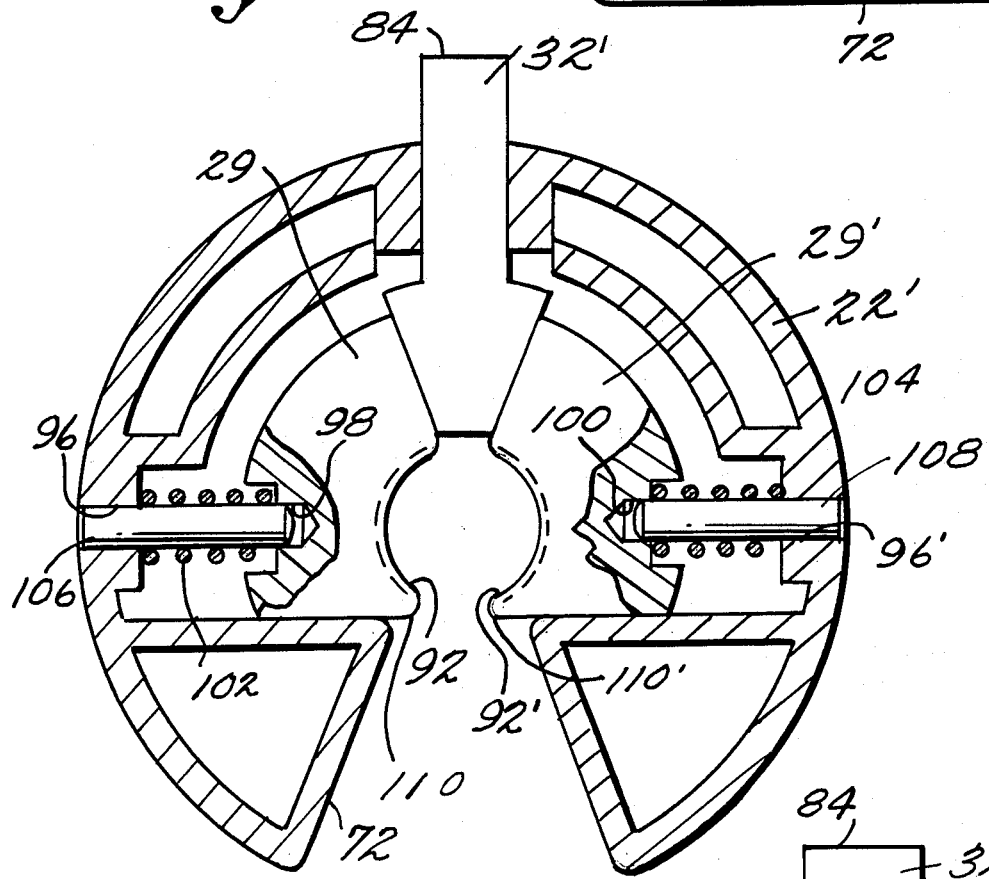
Figure 16:
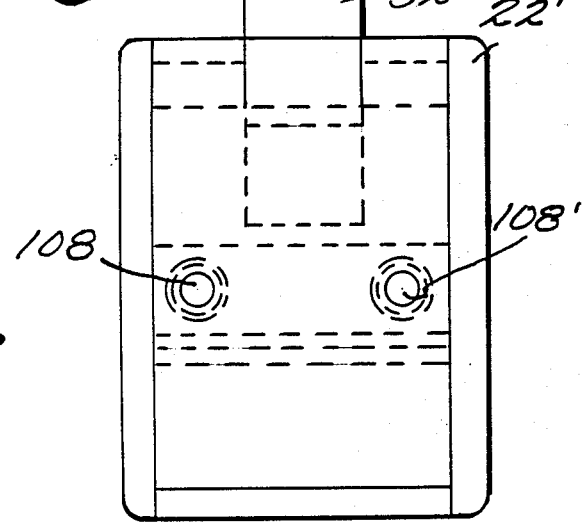

FIG. 6 an exploded perspective view of the embodiment shown in FIG. 4;

FIG. 7 is a perspective view of still another embodiment of the invention;

FIG. 8 is a view, partly in section, of the embodiment shown in FIG. 7;

FIG. 9 an exploded perspective view of the embodiment shown in FIG. 7;

FIG. 10 a perspective view of another embodiment of the invention adapted for use with threaded bolts;

FIG. 11 is a perspective view of a single wedge member of the embodiment shown in FIG. 10;

FIG. 12 is a fragmentary sectional view of the embodiment shown in FIG. 10;

FIG. 13 sectional view taken along the line 13—13 in FIG. 12 in the direction of the arrows;

FIG. 14 is a front elevation view of another invention embodiment;

FIG. 15 is a cross sectional view of the embodiment shown in FIG. 14 and looking in the direction of the arrows; and FIG. 16 is an end elevation view of the embodiment shown in FIG. 14.

With reference now to the drawings, wherein like reference characters designate like or corresponding parts throughout the several views there is shown in FIGS. 1-3 one preferred embodiment 20 of the cord or rod clamp. Clamp 20 includes a housing 22 which defines a central opening 24 and an interior compartment 26 in fluid communication with opening 24. First and second opposed jaw members 28, 28' are movably positioned within compartment 26, and spring elements 30, 30' are provided in operative relationship with housing 22 and with jaw members 28, 28', respectively, for normally forcing the jaw members toward each other and for positioning the jaw members in substantially contacting relationship with each other within opening 24.

Wedge means 32 are provided in operative relationship with housing 22 and with jaw members 28, 28' for enabling an operator to selectively separate jaw members from each other to permit insertion of a cord or rod 34 into opening 24 and between jaw members 28, 28'.

Jaw members 28, 28' each defines an outer substantially arcuate surface 36, 36', respectively, and inner surfaces 38, 38', respectively, for contacting and gripping cord or rod 34. First jaw member 28 also defines first and second side surfaces 40, 40', and second jaw member 28' defines first and second side surfaces 42, 42'. Surfaces 40, 40', 42, 42' are positioned in slideable contact with wedge means 32.

Housing 22 further defines first and second opposed openings 44, 44', and wedge means 32 include first and second opposed wedge members 46, 46'. Wedge member 46 defines first and second lateral surfaces 48, 48', and second wedge member 46' defines first and second lateral surfaces 50, 50'. Surfaces 48, 48' of wedge member 46 are in slideable contact with surfaces 40, 42, respectively, of jaw members 28, 28', and surfaces 50, 50' of wedge member 46' are in slideable contact with surfaces 40', 42', respectively, of jaw members 28, 28'.

Each of wedge members 46, 46' defines a handle or button 52, 52', respectively, which projects through respective ones of openings 44, 44' for enabling an operator to push wedge members 46, 46' toward each other, whereby jaw members 28, 28' are forced apart against the resistance of spring elements or positioning means 30, 30' to permit insertion of cord or rod 34 through opening 24 and between the jaw members.

In accordance with this embodiment of the invention, each of wedge members 46, 46' defines an outer stop surface 54, 54', respectively, and each of wedge members 46, 46' is of a size and configuration to contact inner surfaces 56, 56', respectively, of housing 22 with stop surfaces 54, 54' when spring elements 30, 30' place jaw members 28, 28' into substantially contacting relationship with each other.

Inner surface 38, 38' of each jaw member 28, 28' is preferably serrated to form lands and grooves to facilitate grasping of cord or rod 34. The lands and grooves of the serrations can extend substantially perpendicularly with respect to rod or cord 34 as it passes through central opening 24 (see FIGS. 10-13) or the lands and grooves of the serrations can extend substantially in parallel relationship with respect to rod or cord 34 as it passes through opening 24 (see FIGS. 1-9).

Figure 5:
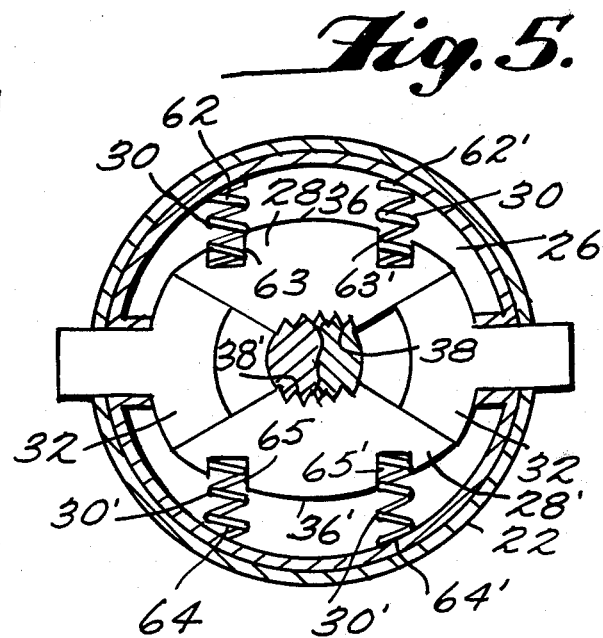
FIG. 5 is a view, partly in section, of the embodiment shown in FIG. 4.

As illustrated in FIGS. 2 and 3, arcuate surfaces 36, 36' of jaw members 28, 28' may define a part of a circle, or in an alternative embodiment, as shown in FIGS. 5 and 6, arcuate surfaces 36, 36' may define a part of an ellipse.

As shown in FIGS. 2 and 3, spring elements 30, 30' are comprised of leaf springs which are positioned between housing 22 and jaw members 28, 28'. As illustrated in FIGS. 5 and 6, spring elements 30, 30' include coil springs 62, 62' positioned within notched portions 63, 63', respectively, of jaw member 28 and coil springs 64, 64' positioned within notches 65, 65', respectively, in jaw member 28'.

An alternative clamp embodiment 70 is illustrated in FIGS. 7-9. Housing 22' defines an open segment 72 in fluid communication with central opening 24 for permitting lateral introduction of cord or rod 34 into opening 24. Housing 22' further includes first and second walls 74, 74' located in slideable contact with first side surfaces 76, 76', respectively, of jaw members 29, 29'.

Housing 22' further defines an additional opening 78 therein, and wedge means 32' include a wedge member 80 defining first and second lateral surfaces 82, 82' slideably contacting second side surfaces 84, 84', respectively, of jaw members 29, 29'. Wedge member 80 also defines a handle or button 84 which projects through opening 78 for enabling an operator to push wedge member 80 inwardly with respect to housing 22' whereby jaw members 29, 29' are forced apart against the resistance of spring elements 86, 86' to permit lateral insertion of cord or rod 34 through open segment 72 and into central opening 24 between jaw members 29, 29'.

As shown in FIG. 8, spring elements 86, 86' may be coil springs which are positioned within notches 88, 88' of jaw members 29, 29', respectively, and between the notches and housing 22'.

Wedge member 80 defines an outer stop surface 90, and wedge member 80 is of a size and configuration to contact inner surface 91 of housing 22' with stop surface 90 when spring elements 86, 86' place jaw members 29, 29' into substantially contacting relationship with each other within opening 24.

Additional opening 78 is located within housing 22' opposite from open segment 72, and walls 74, 74' of housing 22' are substantially aligned with each other and are contiguous with open segment 72 and with central opening 24. As in the previously described embodiment, inner surfaces 92, 92' of jaw members 29, 29', respectively, are serrated to form a series of lands and grooves. The lands and grooves of the serrations can extend substantially perpendicularly with respect to rod or cord 34 as it passes through central opening 24, or the lands and grooves of the serrations can extend substantially in parallel relationship with respect to rod or cord 34 as it passes through opening 24.

In operation of the embodiments illustrated in FIGS. 1-6, handles or buttons 52, 52' are depressed by the operator. As a result, wedge members 46, 46' are moved inwardly to force apart jaw members 28, 28'. Cord or rod 34 is then inserted end-on through central opening 24 and between inner surfaces 38, 38' of jaw members 28, 28', respectively. Clamp 20 is then moved along the length of cord or rod 34 to any desired position, and upon reaching a desired position the operator releases buttons 52, 52'. The release of buttons 52, 52' enables spring elements 30, 30' to force jaw members 28, 28', respectively, toward central opening 24 whereby inner gripping surfaces 38, 38' contact and grip cord or rod 34. This procedure is reversed when it is desired to adjust the position of clamp 20 on cord or rod 34 or when it is desired to remove clamp 20 from cord or rod 34. Of course, more than one cord or rod 34 may be positioned within opening 24 in accordance with the teachings herein.

In operation of the embodiment illustrated in FIGS. 7-9, the operator depresses handle or button 84 to cause inward movement of wedge member 80. This, in turn, causes jaw members 29, 29' to move apart from each other against the forces of spring elements 86, 86'. Cord or rod 34 can then be laterally introduced through open segment 72 into central opening 24 between inner gripping surfaces 92, 92' of jaw members 29, 29', respectively. When cord or rod 34 is properly positioned, the operator releases pressure on button 84, and spring elements 86, 86' cause jaw elements 29, 29' to move toward each other whereby inner gripping surfaces 92, 92' grasp and hold rod or cord 34. If it is desired to adjust the position of cord or rod 34 with respect to clamp 70, jaw members 29, 29' can be separated by depressing button 84. This will allow cord or rod 34 to be axially adjusted with respect to clamp 70. Similarly, if it is desired to remove cord or rod 34 from clamp 70, button 84 is depressed to separate jaw members 29, 29'. Cord or rod 34 can then be quickly and easily removed from its position between jaw members 29, 29', and the cord or rod can be laterally removed through open segment 72.

Handles 94, 94' on clamp 70 are provided to assist in handling and adjusting the position of clamp 70. Open segment 72 in housing 22' of clamp 70 enables the rod or cord to be quickly and easily laterally inserted into the clamp and avoids the necessity of aligning the rod or cord in end-on relationship with central opening 24 before the rod or cord can be inserted into the clamp.

Another invention embodiment is illustrated in FIGS. 14-16. Housing 22' defines first and second apertures 96, 96' therein, and first jaw member 29 defines a third aperture 98 therein. Similarly, second jaw member 29' defines a fourth aperture 100 therein. Positioning means include a first coil spring element 102 located between first aperture 96 and third aperture 98. The positioning means also include a second coil spring element 104 located between second aperture 96' and fourth aperture 100. A first pin member 106 is located within and extends between apertures 98 and 96, and pin member 106 is located within first coil spring element 102, as illustrated in FIG. 15. Likewise, a second pin member 108 is located within and extends between apertures 96' and 100, and pin member 108 is located within second coil spring element 104, as shown in FIG. 15. Inner surfaces 92, 92' preferably together subtend circular arcs totalling at least two hundred seventy degrees to provide sufficient grasping surface area. As a result, portions 110, 110' of jaw members 29, 29', respectively, normally project slightly into the opening defined by open segment 72.

Use and operation of the embodiment illustrated in FIGS. 14-16 is substantially identical with the previously described use and operation of the embodiment illustrated in FIGS. 7-9. Pin members 106, 108 provide guides for springs 102, 104, respectively, and the pin members also prevent undesirable rotational movement of jaw members 29, 29'.

The invention in its broader aspects is not limited to the specific details shown and described, and departures may be made from such details without departing from the principles of the invention and without sacrificing its chief advantages.

What is claimed is:

1. A cord or rod clamp, comprising:
   a housing defining a central opening and an interior compartment in fluid communication with said opening;
   first and second opposed jaw members movably positioned within said compartment;
   means in operative relationship with said housing and with said jaw members for normally positioning said jaw members in substantially contacting relationship with each other within said opening; and
   wedge means movably positioned within said interior compartment and in operative relationship with said housing and with said jaw members for enabling an operator to selectively separate said jaw members from each other to permit insertion of a cord or rod into said opening and between said jaw members.

2. A clamp as in claim 1 wherein said jaw members each defines first and second side surfaces and an inner surface for contacting and gripping said cord or rod.

3. A clamp as sin claim 2 wherein predetermined of said side surfaces slideably contact said wedge means.

4. A clamp as in claim 3 wherein said housing defines first and second opposed openings therein and wherein said wedge means include:
   first and second opposed wedge members, each of said wedge members defining first and second lateral surfaces slideably contacting respective ones of said side surfaces; and;
   each of said wedge members defining a handle projecting through respective ones of said first and second openings for enabling an operator to push said wedge members toward each other whereby said jaw members are forced apart against resistance of said positioning means to permit insertion of a cord or rod between said jaw members.

5. A clamp as in claim 4 wherein each of said wedge members defines an outer stop surface and wherein said wedge members are of a size and configuration to contact an inner surface of said housing with said stop surfaces when said positioning means places said jaw members into substantially contacting relationship with each other.

6. A clamp as in claim 5 wherein said positioning means include springs positioned between said jaw members and said housing for normally forcing said jaw members toward each other.

7. A clamp as in claim 6 wherein said inner surface of each said jaw member is serrated to form lands and grooves.

8. A clamp as in claim 7 wherein said lands and grooves of said serrations extend substantially perpendicularly with respect to said cord or rod as it passes through said central opening.

9. A clamp as in claim 7 wherein said jaw members each defines an outer substantially arcuate surface and wherein said arcuate surface defines a part of a circle.

10. A clamp as in claim 7 wherein said jaw members each defines an outer substantially arcuate surface and wherein said arcuate surface defines a part of an ellipse.

11. A clamp as in claim 3 wherein said housing further defines an open segment in fluid communication with said central opening for permitting lateral introduction of a cord or rod into said central opening.

12. A clamp as in claim 11 wherein said housing further includes first and second walls located in slideable contact with said first side surfaces of said jaw members.

13. A clamp as in claim 12 wherein said housing defines an additional opening therein and wherein said wedge means include:
   a wedge member defining first and second lateral surfaces slideably contacting said second side surfaces of said jaw members; and
   said wedge member defining a handle projecting through said opening for enabling an operator to push said wedge member inwardly with respect to said housing whereby said jaw members are forced apart to permit lateral insertion of a cord or rod through said open segment into said central opening and between said jaw members.

14. A clamp as in claim 13 wherein said wedge member defines an outer stop surface and wherein said wedge member is of a size and configuration to contact an inner surface of said housing with said stop surface when said positioning means places said jaw members into substantially contacting relationship with each other.

15. A clamp as in claim 14 wherein said additional opening is located opposite from said open segment.

16. A clamp as in claim 15 wherein said first and second walls of said housing are substantially aligned with each other.

17. A clamp as in claim 16 wherein said first and second walls of said housing are contiguous with said open segment.

18. A clamp as in claim 17 wherein said inner surface of each said jaw member is serrated to form lands and grooves.

19. A clamp as in claim 18 wherein said lands and grooves of said serrations extend substantially perpendicularly with respect to said cord or rod as it passes through said central opening.

20. A clamp as in claim 19 wherein said housing further defines first and second apertures therein and wherein said first jaw member defines a third aperture therein and said second jaw member defines a fourth aperture therein, said positioning means including a first coil spring element located between said first aperture and said third aperture and a second coil spring element located between said second aperture and said fourth aperture, and said clamp further including a first pin member located within and extending between said first aperture and said third aperture and located within said first coil spring element, and a second pin member located within and extending between said second aperture and said fourth aperture and located within said second coil spring element.

21. A clamp as in claim 20 wherein said inner surfaces together subtend circular arcs totalling at least two hundred seventy degrees to provide sufficient grasping surface area.

* * * * *